United States Patent [19]

Munshi et al.

[11] Patent Number: 4,782,444
[45] Date of Patent: Nov. 1, 1988

[54] COMPILATION USING TWO-COLORED PEBBLING REGISTER ALLOCATION METHOD SUCH THAT SPILL CODE AMOUNT IS INVARIANT WITH BASIC BLOCK'S TEXTUAL ORDERING

[75] Inventors: Ashfaq A. Munshi, San Jose; Karl M. Schimpf, Santa Cruz, both of Calif.

[73] Assignee: International Business Machine Corporation, Armonk, N.Y.

[21] Appl. No.: 809,989

[22] Filed: Dec. 17, 1985

[51] Int. Cl.$^4$ .................. G06F 15/00; G06F 9/44; G06I 12/02; G06I 12/08

[52] U.S. Cl. ..................... 364/300; 364/200

[58] Field of Search ............... 364/200 MS File, 300, 364/900 MS File

[56] References Cited

U.S. PATENT DOCUMENTS

| | | | |
|---|---|---|---|
| 3,400,371 | 9/1968 | Amdahl et al. | 364/200 |
| 3,921,153 | 11/1975 | Belady et al. | 364/200 |
| 4,378,590 | 3/1983 | Kim | 364/200 |
| 4,435,753 | 3/1984 | Rizzi | 364/200 |
| 4,493,020 | 1/1985 | Kim et al. | 364/200 |
| 4,567,574 | 1/1986 | Saadé et al. | 364/300 |
| 4,571,678 | 2/1986 | Chartin | 364/300 |
| 4,656,582 | 4/1987 | Chartin et al. | 364/300 |
| 4,656,583 | 4/1987 | Auslander et al. | 364/300 |
| 4,667,290 | 5/1987 | Gross et al. | 364/300 |
| 4,722,071 | 1/1988 | Gates et al. | 364/300 |
| 4,727,487 | 2/1988 | Mansi et al. | 364/300 |

OTHER PUBLICATIONS

Ruzicka, "Two Variants of the Black-and-White Pebble Game", Computer and Artificial Intelligence, vol. 4, 1985, No. 3, pp. 211–221.
Aho et al., "Principles of Compiler Design", Addison-Wesley Publishing Co., copyright 1977.
Waite et al., "Compiler Construction", Springer-Verlag, copyright 1984.
Chaitin et al., "Register Allocation Via Coloring", Computer Languages, vol. 6, Pergamon Press Limited, copyright 1981, pp. 47–57.
Chaitin, "Register Allocation and Spilling Via Graph Coloring", Proceedings SIGPLAN 82, Symposium on Compiler Construction, SIGPLAN Notices, copyright 1982, pp. 98–105.
Pippenger, "Pebbling", 5th IBM Symposium on the Mathematical Foundations of Computer Science, May 26–28, 1980, Hakone, Japan.
IBM System/370 Principles of Operation, IBM Publication GA22-7000-6.

*Primary Examiner*—Archie E. Williams, Jr.
*Assistant Examiner*—Thomas C. Lee
*Attorney, Agent, or Firm*—R. Bruce Brodie

[57] ABSTRACT

A method for allocating and optimizing register assignments during compiling of source into executable code in either a scalar or vector processor uses a pebble game heuristic played on each basic block dependency graph for local optimization. Like variable analysis and loop unrolling are used for global optimization.

5 Claims, 2 Drawing Sheets

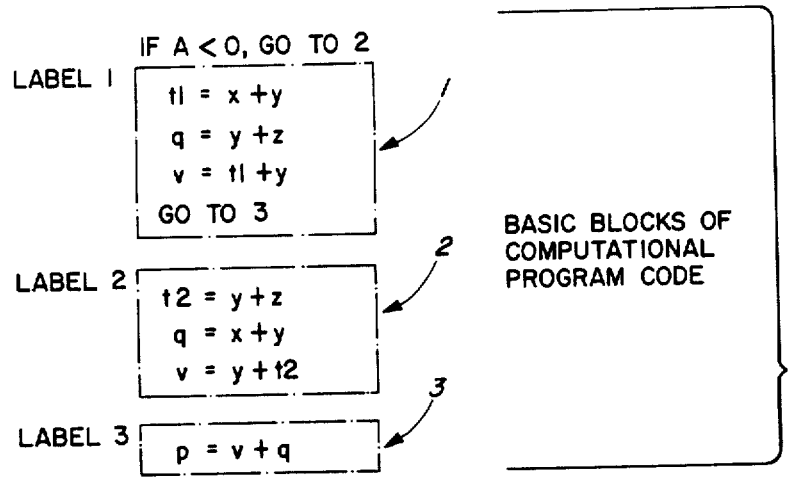
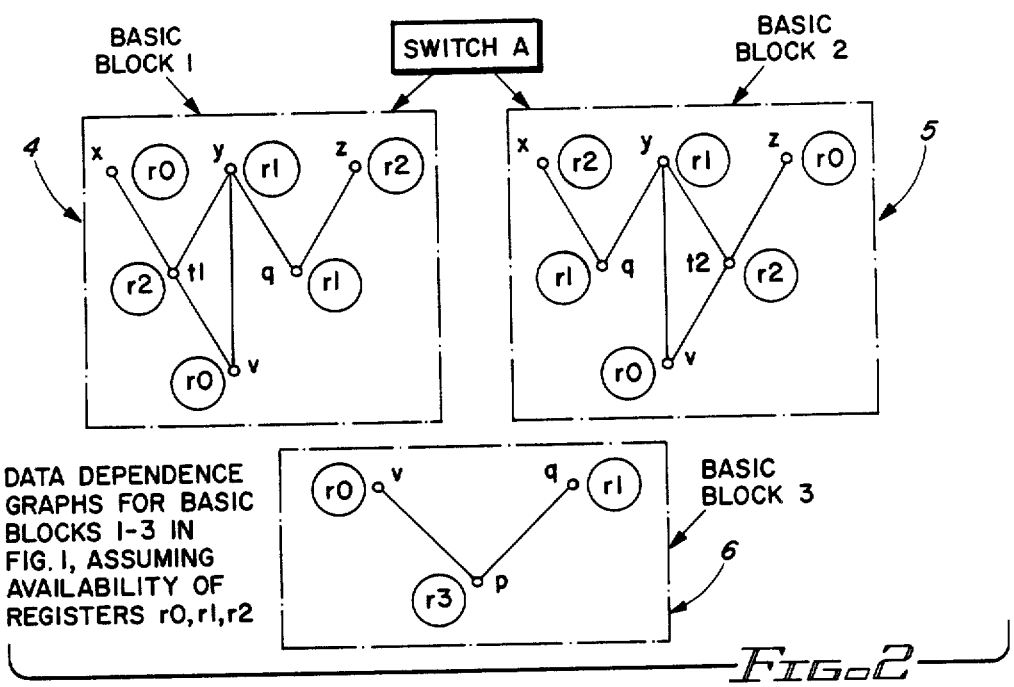
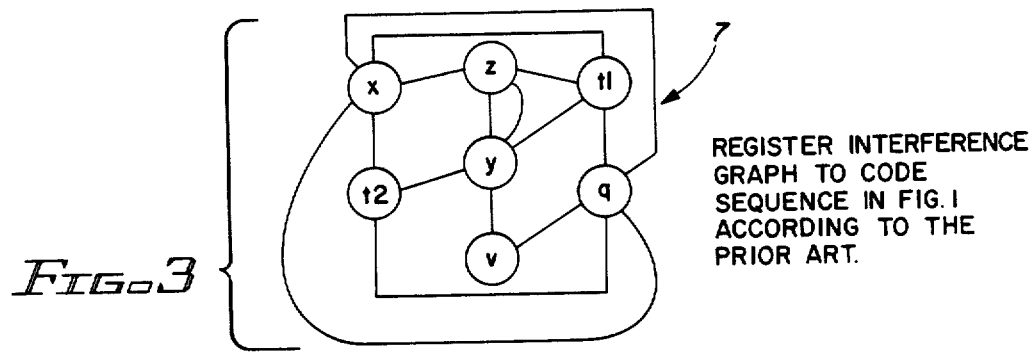

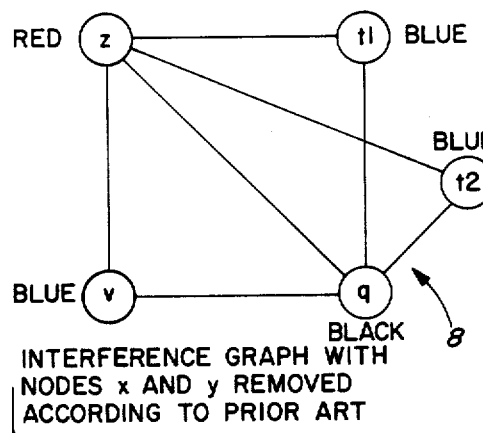
FIG. 4 — INTERFERENCE GRAPH WITH NODES x AND y REMOVED ACCORDING TO PRIOR ART
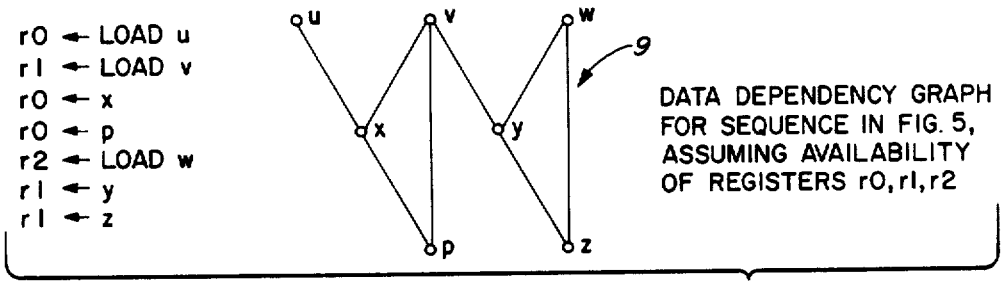
FIG. 5 — COMPUTATIONAL SEQUENCE
FIG. 6 — DATA DEPENDENCY GRAPH FOR SEQUENCE IN FIG. 5, ASSUMING AVAILABILITY OF REGISTERS r0, r1, r2
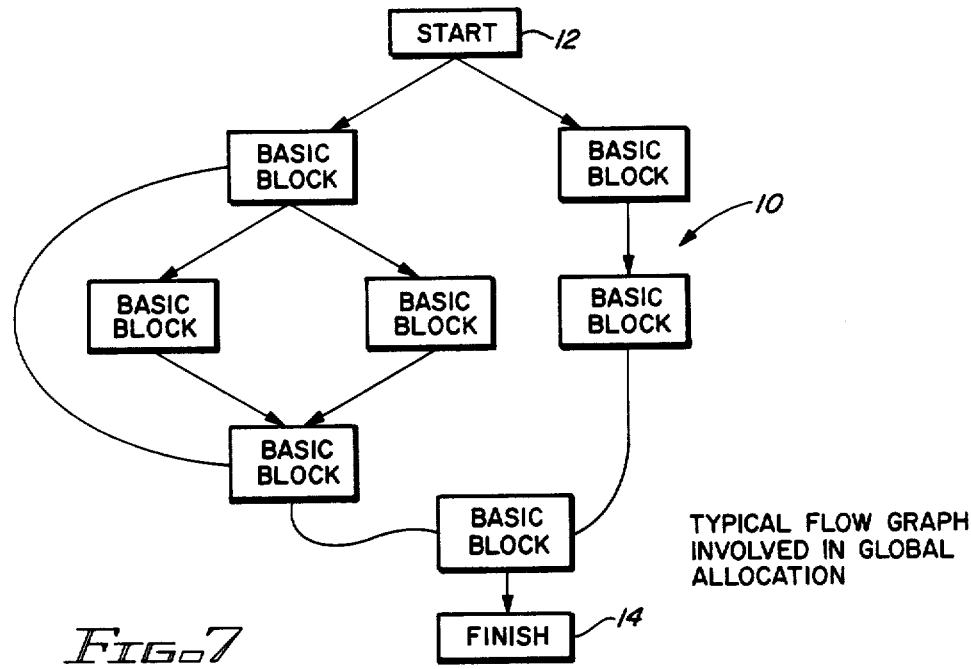
FIG. 7 — TYPICAL FLOW GRAPH INVOLVED IN GLOBAL ALLOCATION ns
COMPILATION USING TWO-COLORED PEBBLING REGISTER ALLOCATION METHOD SUCH THAT SPILL CODE AMOUNT IS INVARIANT WITH BASIC BLOCK'S TEXTUAL ORDERING

TECHNICAL FIELD

This invention relates to a method for allocating and optimizing register assignments during compiling of source into machine-executable code in either a scalar or vector processor.

BACKGROUND

Among the standard works on compiler construction, Aho et al, "Principles of Compiler Design", Addison-Wesley Publishing Co., copyright 1977, and Waite et al, "Compiler Construction", Springer-Verlag, copyright 1984, point out that the conversion of a computer source language such as PASCAL or FORTRAN into code executable by a target machine is done through a series of transformations. First, the source symbol string is lexically analyzed to ascertain the atomic units or words for translation, and then syntactically analyzed for ascertaining the grammatical relations among the words. The output is expressed in the form of a "parse tree". The parse tree is transformed into an intermediate language representation of the source code. Most compilers do not generate a parse tree explicitly, but form the intermediate code as the syntactic analysis takes place. Optimization is then applied to the intermediate code after which the target machine-executable or object code is generated.

Among the tasks that a compiler must perform are the allocation and assignment of computing resources so that the computation specified by a stream of source code instructions can be efficiently completed. Among the "resources" available include computational facilities such as an ALU, input/output, memory including registers, operating system elements, etc. The objectives of the optimization portion of the compiler are to (a) shrink the size of the code, (b) increase the speed of execution where possible, and (c) minimize costs through efficient resource allocation. A schedule of resource use or consumption pattern is then embedded in the code being compiled.

It is well known that an instruction stream can be mapped onto graphical structures and advantage taken of graph-theoretic properties. Code sequences may be analyzed by way of the graphical properties of basic blocks with respect to local optimization, and flow graphs of blocks with respect to global optimization.

A basic block is a sequence of consecutive statements. This sequence may be entered only at the beginning and when entered the statements are executed in sequence without halt or possibility of branch, except at the end thereof.

A flow graph describes the flow of control among basic blocks. The flow graph would, for example, show the looping, branching, and nesting behavior among basic blocks necessary for iterative or recursive computation.

A directed acyclic graph (DAG) of the data dependencies is a data structure for analyzing basic blocks. For instance, $a = S + c$ is rendered by b+c as starting nodes, each connected to common node c through respective edges. It is not a flow graph, although each node or (basic block) of a flow graph could be represented by a DAG.

"Live variable analysis" refers to a set of techniques for ascertaining whether a name has a value which may be subsequently used in a computation. A name is considered "live" coming into a block if the name is either used before redefinition within a basic block, or is "live" coming out of the block and is not "redefined" within the block. Thus, after a value is computed in a register, and is presumably used within a basic block, it is not necessary to store that value if it is "dead" at the end of the block. Also, if all registers are full and another register is needed, assignment could be made to a register presently containing a "dead" value.

Conceptually, the first compiler transformation consists of mapping strings of source code onto a flow graph, each of whose nodes are basic blocks and whose control and data path relationships are defined by the directed edges of the flow graph. Optimization in the allocation and assignment of resources can be considered first at the local or basic block level, and then at the global or flow graph level.

In local optimization, each basic block is treated as a separate unit and optimized without regard to its content. A data dependence graph is built for the basic block, transformed, and used to generate the final machine code. It is then discarded and the next basic block considered. A "data dependence graph" is a graph-theoretic attribute representation within a basic block. Since a basic block cannot contain cycles, all the data dependence graphs' basic blocks can be represented by DAGs. Parenthetically, a DAG is not necessarily a tree. Illustratively, if a basic block consisted of two computational statements $x = u + v$ and $y = u + w$, the DAG would not be a tree although it is acyclic. Lastly, global optimization performs global rearrangement of the flow graph and provides contextual information at the basic block boundaries.

A computer includes memory, the fastest form of which is the most expensive. A finite number of physical registers store operands for immediate use for computation and control. Computer instructions operating register to register are the fastest executing. If a register is unavailable, an intermediate result must either be loaded to main memory where the bulk of programs and data are located, or loaded from said main memory into a register when a register becomes available. Loads and stores to registers from memory take a substantially longer time. Thus, when evaluating either a flow graph or a basic block, one objective is to keep as many computational names or variables in the registers or to have a register available as needed.

Register allocation involves identifying the names in the software stream which should reside in registers (i.e. the number of registers needed); while assignment is the step of assigning registers to nodes following an underlying scheme, rule, or model. Among the allocation strategies used in the prior art was to have the assignment fixed; that is, where specific types of quantities in an object program were assigned to certain registers. For instance, subroutine links could be assigned to a first register group, base addresses to a second register group, arithmetic computations to a third register group, runtime stackpointers to a fixed register, etc. The disadvantage of such fixed mapping is that register usage does not dynamically follow execution needs. This means that some registers are not used at all, are overused, or are underused.

Global register allocation relates to the observation that most programs spend most of their time in inner loops. Thus, one approach to assignment is to keep a frequently used name in a fixed register throughout a loop. Therefore, one strategy might be to assign some fixed number of registers to hold the most active names in each innerloop. The selected names may differ in different loops. Other nondedicated registers may be used to hold values local to one block. This allocation and assignment has the drawback that no given number of registers is the universally right number to make available for global register allocation.

Chaitin et al, "Register Allocation Via Coloring", Computer Languages, Vol. 6, copyright 1981, pp. 47–57, Pergamon Press Limited, and Chaitin, "Register Allocation and Spilling Via Graph Coloring", Proceedings SIGPLAN 82, Symposium on Compiler Construction, SIGPLAN Notices, copyright 1982, pp. 98–105, describe a method of global register allocation across entire procedures. In Chaitin, all registers but one are considered to be part of a uniform pool, and all computations compete on the same basis for these registers. Indeed, no register subsets are reserved.

Chaitin points out that it is intended to keep as many computations as possible in the registers, rather than in storage, since load and store instructions are more expensive than register-to-register instructions. Chaitin notes that it is the responsibility of code generation and optimization to take advantage of the unlimited number of registers, i.e. considered as a pool, allowed in the intermediate language in order to minimize the number of loads and stores in the program.

The critical observation in Chaitin is that register allocation can be analyzed as a graph-coloring problem. The coloring of a graph is an assignment of a color to each of its nodes in such a manner that if two nodes are adjacent (connected by an edge of the graph), they have different colors. The "chromatic number" of the graph is the minimal number of colors in any of its colorings. In Chaitin, register allocation utilizes the construct termed a "register interference graph". Two computations or names which reside in machine registers are said to "interfere" with each other if they are "live" simultaneously at any point in the program.

Chaitin's graph-coloring method includes the steps of (a) building an interference graph from the names with reference to a specific text ordering of code; (b) ascertaining the chromatic number for the graph, and coloring (assigning registers to nodes) if the chromatic number does not exceed the number of available registers, otherwise reducing the graph by retiring a node (excising the node and its connecting edges) having the highest in/out degree; (c) repeating step (b) until the values converge, and (d) accounting for and managing the "spills" by embedding in the compiled code stream appropriate writes to and loads from memory.

SUMMARY OF THE INVENTION

It is an object of this invention to allocate and assign registers optimally during the compilation of source into executable code in either scalar or vector processors, and thereby minimize the number of spills (the number of references to and from memory). It is a related object to allocate and assign registers so that the amount of spill code is invariant with textual ordering within basic blocks.

The objects are satisfied by a method for allocating registers and optimizing said allocation local to regions of code without branches termed "basic blocks" during the optimization phase of the compiling of source into executable code in either a scalar or vector processor. Each basic block has statements defining computations. Also, each processor comprises memory for storing sequences of executable code and data, and means for accessing said memory and executing any accessed code. In the processor, the memory is mapped as a two-level model including a finite number p of registers and a comparably infinite internal memory. Relatedly, the registers have access times faster than that of internal memory.

The inventive method comprises the processor-implemented steps of (a) ascertaining the data dependency graph attributes of a basic block, and (b) generating an allocation and assignment for q of the p registers with reference to all computations within the basic block by performing a "two-color pebbling game" heuristic over the ascertained data dependency graph utilizing the two-level memory model.

The foregoing objects are further satisfied by a method for both local and global register optimization comprising the step, in addition to (a) and (b) above, of (c) performing live variable analysis, and responsively generating a global register allocation and assignment assuming that loops are the most significant optimization entity.

Unlike Chaitin's "register interference graph", a data dependency graph is invariant to textual ordering. The method of this invention partitions the allocation process into two steps. The first step is to obtain a good local allocation, and the second step is to use the local allocation to obtain the global one. The pebbling game heuristic played upon the data dependency graph ensures that spills within the basic blocks are minimized. The heuristic involves the exercise of a red-blue pebble game on the graphs corresponding to the basic blocks. Accesses to memory are modeled by way of placement of blue pebbles on the graph, while accesses to registers are modeled by way of placement of red pebbles on the graph. This model precisely controls spills. The same dependency graph always yields the same allocation.

Significantly, while performing the local allocation, not all available registers are used. Indeed, some registers are set aside for carrying global information. Relatedly, the second major step is that of performing global allocation using these registers to further reduce accesses to memory. The variables that are chosen for these global registers are selected so as to maximally reduce the number of load or store operations in the entire program.

For purposes of this invention, a pebbling game is a one-person game played on a DAG. The player is given two types of pebbles: red and blue. The number of blue pebbles is infinite, while the number of red pebbles is restricted to some number, say p. Initially, the DAG has all sources pebbled blue. The player is allowed to make any one of the following moves:

(1) Put a red pebble next to a blue pebble;
(2) Put a blue pebble next to a red pebble;
(3) Put a red pebble on a node, if and only if all of the predecessor nodes are pebbled red;
(4) Slide a red pebble to a node from one of its predecessor nodes, if and only if the predecessor nodes were pebbled red before the slide; or
(5) Remove a red pebble at any time.

In this regard, blue pebbles are memory locations while red pebbles are registers. In this context, rule (1)

is a load from memory, rule (2) is a write to memory, rule (3) is a computation of a value into a new register, and rule (4) is the computation of a value into a register which previously held an operand used in the computation. The object of the game in the register allocation context is to minimize the number of spills, where a spill involves the use of rules (1) or (2).

Pebble games have been described in the prior art, as in Pippenger, "Pebbling", 5th IBM Symposium on the Mathematical Foundations of Computer Science, May 26–28 1980, Hakone, Japan. Pippenger pointed out that pebbling has found a range of applications including compilers, and in particular, code generation and optimization. The game referenced by Pippenger is a one-color game, sometimes called the "black pebble game".

Admittedly, the "black pebble game" has been used for the study of space-time tradeoffs. A "space-time tradeoff" involves the consequences of varying the factors formed by the product of the number of available registers and the time it takes to perform the computation. The product is an amount proportional to the number of nodes in a data dependence graph. If only one color represents a register, then for any given computation, Pippenger asks "what is the minimum number of registers required in order to perform said computation?" However, Pippenger's one-color pebble game neither teaches nor suggests the inventive method. Significantly, the invention treats an allocation and assignment of registers via two-color pebbling upon a DAG for local optimization and loop-based global optimization which together minimize the spills as compared to the prevailing graph-coloring method.

BRIEF DESCRIPTION OF THE DRAWING

FIG. 1 depicts a computational sequence of three basic blocks of program code.

FIG. 2 is a data dependency graph rendition of the blocks of FIG. 1 used in a first example illustrating local register allocation using a pebbling heuristic, according to the invention.

FIG. 3 shows a register interference graph of the sequence of FIG. 1, according to the prior art.

FIG. 4 represents the interference graph of FIG. 3 reduced by several nodes to permit "coloring", according to the prior art.

FIG. 5 represents a computational sequence.

FIG. 6 shows data dependency graph, and a register activity sequence used in a second example of local register allocation using the pebbling heuristic, according to the invention.

FIG. 7 sets out a flow graph of basic blocks involved in the description of the global allocation step, according to the invention.

DESCRIPTION OF THE PREFERRED EMBODIMENT AND INDUSTRIAL APPLICABILITY

The description will first treat the allocation and assignment of registers to achieve local optimization by way of a description of a pebble game heuristic algorithm, to be then followed by a discussion of global allocation.

Local Optimization

Local optimization utilizes a "pebble game" heuristic. For purposes of this invention, a "heuristic" is an intuitively-based, machine-implementable procedure or algorithm for achieving a prospectively near optimal result.

A First Example

Referring now to FIGS. 1–5 and 6, there are shown computational sequences partitioned into basic blocks 1–3 and represented by counterpart data dependency graphs of the DAG type. The heuristic to a first approximation proceeds as follows:

1. Examine a DAG and identify p dominating nodes, i.e. the nodes having the largest number of successors, where p is the number of red pebbles. Associate with each such set of p nodes a cost which is the number of nodes in the set that are not red. Now choose, amongst these sets, the set which has the smallest value of cost/size of dominator. This defines a "promising" area for computation.

2. Next, find a "good" computation by computing the cover cost of each node that is an immediate successor of the set chosen above. The cover cost has two parameters. These include (a) the number of predecessor nodes not pebbled red, and (b) the minimum slide cost over the immediate ancestors of the node. Relatedly, the slide cost references the predecessors in (a) having the smallest out degree. By "out degree", it is meant successor nodes which have not as yet been computed. Parenthetically, the number of noncomputed successors changes once a computation has been performed. Thus, for example, in FIG. 2 referencing basic block 14, the node t1 has a cover cost of (2,1). Here, the number of predecessor nodes is two (nodes x and y), while the slide cost (out degree to noncomputed successor nodes) initially for x is 1 and for y is 3. Selection is made for the one that has the smaller slide cost. Once the cover cost has been computed, the computation that will be performed in the next step of the algorithm is chosen to be the one with the smallest cover cost.

3. Once having decided upon a "good" computation, red pebbling subordinate nodes use the rule for sliding pebbles. If no red pebbles can be used to perform a slide, a pebble not currently on the DAG is used if one exists.

4. If registers are not available, then an intermediate result must be written out to memory and then loaded back when needed.

Referring now to FIG. 2, node t1 is dependent upon the sources x and y, while node q is dependent upon nodes y and z. The result v in turn depends upon t1 and v. Assuming that three registers r0, r1, and r2 are available, a dominator consisting of three nodes is chosen. The only possible dominator is the set {x,y,z}. Hence, this is dubbed the "promising" set.

Nodes t1 and q are successors of the dominating set chosen. For each node, the cover cost is computed. The cover cost of t1 is (2,1) because two predecessors of t1 are unpebbled and the minimum slide cost is 1 since x has only one uncomputed successor. This is similarly the case for q. Since the cover cost is the same for both t1 and q, one node is chosen arbitrarily, say t1. In order to compute t1, red pebbles must first be placed on x and y. Next, slide x to t1 because the slide cost of x is 1. Now, node v can be computed by sliding the red pebble on t1 to v. Then node q can be computed, after loading z, by sliding the pebble on y to q.

The foregoing analysis points out that, given a sufficient number of registers, scheduling can be rendered reasonably smoothly.

Referring now to FIGS. 3 and 4, there is shown a register interference graph 7 according to the prior art Chaitin references of the computation sequence depicted in FIG. 1. The FIG. 3 graph 7 is technically three-colorable. However, if only two registers were available (r0, r1), then it would not be possible to color the graph per se. It would be necessary to remove or retire nodes in highest-degree order. In this regard, FIG. 4 is an example of the prior art interference graph 8 with nodes x and y removed. However, in order to be two-colorable, node z would also have to be removed. The retirement of three nodes indicates a substantial amount of spill code. In contrast, if one were to render only two registers available and assign them according to the data dependence graph in FIG. 2, only three loads and one store would be required by comparison.

A More Refined Example

Referring now to FIGS. 5 and 6, again suppose there are three registers and three red pebbles available. According to the algorithm, nodes u, v, and w would be picked as dominating nodes. The cover cost $(x)=(2,1)$, while the cover cost $(y)=(2,2)$. Hence, the algorithm chooses to evaluate node x. Since the cover cost $=(c1, c2)$, then for $c1=2$, the algorithm computes spill nodes (x) for the current frontier. The term frontier derives from the set of nodes with the property that for every node v in the set, the node has a pebble on it, and at least one successor of v has not been computed. This is termed the frontier.

Since no red pebbles on the DAG have been placed, it is empty. Hence, the method can place free red pebbles on nodes u and v. Also, since $c2=1$, the register at node u is slid to node x and one computation is completed. Once again, another dominator is chosen. This time node p is targeted for computation because the cover cost $(p)=(0,1)$. As before, $c2=1$. This means that the register on node x is slid to node p.

It is clear now that the method will have to compute node y, and then node z, because no other choices are available. See FIG. 5. Further note that only three loads have been performed, and also that both p and z are available in registers. This means that if either is used later, there need not be any load from memory.

Significantly, no matter how the code in the sequences is permuted, the data dependency graphs are invariant. Hence, the results produced by the method are independent of textual order.

Also note that if the prior art of coloring had been applied to the code as shown in FIG. 6, the number of loads would be four, while the number of loads for the inventive method is only three, the smallest number possible.

Global Optimization

In this invention, global optimization first involves performing local allocations for each basic block in the order that they appear in a flow graph using some fraction of the total number of available registers. Then, assuming that loops are the most critical entities, use the remaining registers for carrying global information.

Referring now to FIG. 7, there is shown a flow graph 10 initialized at node start 12 and terminating at node finish 14.

Assuming that local allocations have been made, the global step examines the set of variables that are loaded and stored in each local allocation. For these variables, a count is made of the number of times the variable is loaded or stored. This count is biased by the so-called nesting level of the variable, which refers to the number of loops in the flow graph that surround the variable. From this list, the variable with the highest value is selected to reside in a global register. The process is repeated until no more global registers are available, or the list is empty.

This scheme or step of global allocation has some variants. For instance, the variables that are put into global registers are those that represent the largest live ranges in the flow graph corresponding to the local allocations. That is, the local allocations are substituted for the corresponding basic blocks in the input program. Then, live ranges are computed for all the variables that are not local to a basic block. Live ranges are used to determine which variable is allocated a global register with the number of uses and nesting level-breaking ties.

In the event that variables wind up in different registers at the bottom of the loop, whereas they are assumed to be at the top of the loop, the loop can be unrolled until no transfers are required or the number of transfers is below some predetermined threshold.

---

An Algorithmic Recitation of the Pebble Game Heuristic

```
Algorithm Local_Alloc(DAG,num_registers)
current_frontier := sources(D); /* set frontier to sources
of DAG*/
current_configuration := (empty, current_frontier);
while (number of uncomputed nodes not zero) do
    Find a set S, of p nodes, in the current frontier, such
    that move_cost(S)/(number of nodes that S dominates) is
    minimized.
    /* find a good computation to do */
    compute the cover cost of every node in FS(S);
    Let u be the node in FS(S) with the smallest cover
    cost, where cover_cost(u) = (c1,c2);
    /* find the possible spill nodes for the computation */
    if c1 > 0 then for each node v in spill_nodes(u,S), if
    v is not pebbled blue then place a blue pebble on v.
    Remove the red pebble from v.
    while not all predecessors of u are pebbled red do
        put a free red pebble on a predecessor of u not
        pebbled red.
    /* pebble the computation */
    if c2 = 1 then slide the node with slide_cost = 1 to
    u else
    if any free red pebbles,
        then put free pebble on u
        else begin
            let v be the predecessor of u with the smallest
            slide cost.
            if slide_cost(v) > 0, put a blue pebble on v;
            slide v to u;
        end;
od;
```

---

Extensions of the Invention

The method of this invention can be used in a scalar processor of the IBM System/370 type, or used in vector machines as exemplified by the IBM 3090. In vector processors, it is desired to run a computation at top speed. This means that a computation should access memory as seldom as possible because memory access is very slow compared with the access to vector registers. The pebble game heuristic, as previously described, can be used to determine the number of vector registers as follows. First, select a starting number of vector registers and then run the heuristic on the data dependency graph DAG corresponding to the vector computation that is to be performed. Next, compute the total number of loads/stores performed for this fixed number of registers. After this, compare this number with a lower bound for the number of accesses that are required; that is, the number of sources plus the number of sinks. If too many accesses are performed, double the number of registers and reapply the algorithm. If the lower bound is achieved, then halve the number of registers and repeat the algorithm until an optimal number of registers is identified. This is equivalent to performing a binary search on the number of vector registers and using the pebble game heuristic to determine the search parameter.

Another extension of the invention is its use in machines where computations can be overlapped with loads and stores to memory. Since the heuristic attempts to compute as much as possible based on data currently in registers, it should provide a good overlap between computations and memory accesses.

Processing Environment

This invention can be conveniently executed when embedded in the optimizer portion of a high-level language compiler, such as that found in PL/I, FORTRAN, COBOL, etc., and executed on a system such as an IBM System/370 as described in Amdahl et al, U.S. Pat. No. 3,400,371, "Data Processing System", issued Sept. 3, 1968, and in IBM System/370 Principles of Operation, IBM Publication GA22-7000-6.

We claim:

1. A method for allocating and optimizing register assignments during the compiling of source into executable code in either a scalar or a vector processor, the source code including regions of code without branches termed "basic blocks", each basic block having statements defining computations, each processor comprising memory for storing sequences of executable code and data, and means for accessing said memory and executing any accessed code; the memory being mapped as a two-level model including a finite number p greater than 0 of registers and a comparably infinite internal memory, said registers having access times faster than that of internal memory, comprising the processor-implemented steps of:

(a) ascertaining data dependency graph attributes of each basic block;

(b) generating a local register allocation and assignment for q of the p registers in the range $0 < q < p$ with reference to all computations within each basic block by performing a "two-color pebbling game" heuristic over the ascertained data dependency graph utilizing the two-level memory model; and (c) performing live variable analysis upon a flow graph-like representation of the basic blocks and responsively generating a global register allocation and assignment among (p-q) remaining registers assuming that loops expressed in the flow graph among the basic blocks are the most significant optimization entity.

2. A method according to claim 1, wherein the data dependency graph for each basic block is of the directed acyclic graph type.

3. A method according to claim 1, wherein the step of generating a local register allocation and assignment includes the steps of:

(b1) selecting the set of nodes of the graph which have the largest number of successors (dominators) in a leaf-to-root node direction;

(b2) ascertaining a cover cost of every node that is an immediate successor of the set chosen above, and assigning a register to that immediate successor in the set for which the cover cost is minimal; and (b3) in the absence of any available allocatable registers, writing out an intermediate or final result signified by the computation at that node to internal memory and then subsequently loading said result back to an available register as required.

4. A method according to claim 1, wherein the step of generating a global register allocation and schedule includes:

(c1) generating a list for each variable and the frequency with which the variable is loaded or stored in the local allocations for these basic blocks weighted by the nesting level of that variable; and (c2) selecting the variable having the highest frequency to reside in a global register, the steps of listing and selection being repeated until either no more of the (p-q) global registers are available, or the list is empty.

5. A method according to claim 1, wherein the step of performing live variable analysis and responsively allocating and assigning (p-q) registers globally includes the steps of ascertaining the "live ranges" for all variables not local to a basic block; and allocating the variable with the largest live range to a global register, and in the event of two or more variables having the same live range, assigning one of the (p-q) registers to that variable having the largest number of uses or nesting level.

* * * * *